United States Patent [19]

Hashimoto et al.

[11] Patent Number: 5,333,234
[45] Date of Patent: Jul. 26, 1994

[54] CURABLE COMPOSITION FOR USE IN OPTICAL FIBER CLADDING AND OPTICAL FIBER EQUIPPED THEREWITH

[75] Inventors: Yutaka Hashimoto, Sakai; Jun Shirakami, Osaka; Masayuki Kamei, Sakai; Shoshiro Taneichi, Tajimi; Makoto Ichinose, Aichi, all of Japan

[73] Assignees: Dainippon Ink and Chemcials, Inc.; Toray Industries, Inc., Tokyo, Japan

[21] Appl. No.: 931,365

[22] Filed: Aug. 18, 1992

[30] Foreign Application Priority Data

Aug. 23, 1991 [JP] Japan .................................. 3-212447

[51] Int. Cl.$^5$ ......................... C08F 2/50; C08F 220/24
[52] U.S. Cl. ................................... 385/145; 522/172; 522/182; 522/42
[58] Field of Search .................... 522/182, 172, 42; 385/145, 123

[56] References Cited

U.S. PATENT DOCUMENTS 3,457,247  7/1969  Katsushima et al. ............. 522/182
5,128,389  7/1992  Inukai et al. ..................... 522/182

FOREIGN PATENT DOCUMENTS 0243605  11/1987  European Pat. Off. .
0250996   1/1988  European Pat. Off. .
0256765   2/1988  European Pat. Off. .
0257863   3/1988  European Pat. Off. .

OTHER PUBLICATIONS

Derwent Abstract of JP-A-61066706, Apr. 15, 1986.

Primary Examiner—Susan Berman
Attorney, Agent, or Firm—Armstrong, Westerman, Hattori, McLeland & Naughton

[57] ABSTRACT

The present invention provides a curable composition for use in optical fiber cladding comprising 48.8~92.9 wt % of 2-(perfluorooctyl) ethyl acrylate (I), 1.3~23.8 wt % of 2,2,3,3-tetrafluoroproprylacrylate (II), 5.0~30.0 wt % of trimethylolpropane triacrylate (III), and 0.1~5.0 wt % of photopolymerization initiator (IV), wherein the weight ratio [(I)/(II)] of monomer (I) and monomer (II) is within a range of from 75/25 to 98/2, and an optical fiber having cladding formed by the hardening of this curable composition and a core comprising quartz.

10 Claims, No Drawings

CURABLE COMPOSITION FOR USE IN OPTICAL FIBER CLADDING AND OPTICAL FIBER EQUIPPED THEREWITH

BACKGROUND OF THE INVENTION

The present invention relates to a curable composition for use in optical fiber cladding as well as to an optical fiber using such a cladding, and furthermore, in particular, relates to an optical fiber which has superior mechanical strength, environmental resistance, and optical characteristics, and to a curable composition for use in optical fiber cladding which can be applied to the manufacture thereof.

Plastic cladding optical fibers, hereinafter termed "PCF", in which the core is composed of quartz and the cladding is composed of plastic, have a comparatively low cost, superior transparency, and are capable of a high-level numerical aperture, so that they are used as light guides for optical fibers for medium distance transmission. Heretofore, silicon resin has been used as the cladding material for PCF; however, in order to improve its ease of handling and resistance to the environment, fluoride polymers having a high degree of hardness have recently been proposed and utilized as cladding material.

For example, in U.S Pat. Nos. 4,511,209; 4,707,076; Japanese Patent Application, First Publication Laid-Open No. Sho 63-40104; Japanese Patent Application, First Publication Laid-Open No. Sho 63-43104: Japanese Patent Application, First Publication Laid-Open No. Sho 63-208805; Japanese Patent Application, First Publication Laid-Open No. Sho 63-208806; Japanese Patent Application, First Publication Laid-Open No. Sho 63-208807; Japanese Patent Application, First Publication Laid-Open No. Sho 63-249112; European Patent No. 257863; and European Patent No. 333464; a composition for use in optical fiber cladding which is curable by activating energy rays and an optical fiber formed using this composition are described.

However, the curable composition for use in optical fiber cladding described in the above specifications has poor compatibility and homogeneity at room temperature, and when manufacture of optical fiber is undertaken at room temperature, the optical characteristics such as light transmission characteristics and the like of the optical fiber are extremely poor, and furthermore, the adhesion of the cladding layer to the core is inferior, so that separation of the cladding layer easily occurs, the resistance of the optical fiber to the environment and the tensile strength of the optical fiber are poor, and the resulting optical fiber is completely unfit for use. Furthermore, when, in order to increase the compatibility and homogeneity, the composition for use in the cladding is heated, strict control of the temperature is necessary in order to prevent problems such as eccentricity, and there are problems in that the wire drawing apparatus becomes complicated and operability becomes poor. In addition, in the conventional methods, when the composition for use in cladding is made transparent at room temperature, the mechanical strength of the cladding layer becomes inferior, the index of refraction rises, and it becomes impossible to maintain the numerical aperture which is desired.

Accordingly, the present situation is such that a composition for use in cladding which has superior operability with good transparency even at room temperature, has a low index of refraction, has superior transparency and mechanical strength even after hardening, and exhibits superior mechanical strength, optical characteristics, and resistance to the environment, such as resistance to heat and resistance to moisture, even in the case in which it is used in cladding for optical fibers, is not available.

SUMMARY OF THE INVENTION

The present invention was created in view of the above situation; it has as an object thereof to provide a curable composition for use in optical fiber cladding which has superior operability with excellent transparency at room temperature, has a low index of refraction, and furthermore has superior transparency and mechanical strength even after hardening, as well as to provide a curable composition for use in optical fiber cladding which has superior optical characteristics as well as mechanical strength and resistance to the environment, and to provide an optical fiber using this cladding.

The present inventors have taken pains to solve the above problems, and using a curable composition for the cladding with a fixed composition comprised by simultaneously containing two types of curable fluoromonomer having fluorinated alkyl groups which differ in the carbon numbers thereof, and a type of multifunctional monomer; it was thus found that the problems were solved and the present invention was arrived at.

In other words, the present invention provides a curable composition for use in optical fiber cladding comprising 48.8~92.9 wt % of 2-(perfluorooctyl) ethyl acrylate (I), 1.3~23.8 wt % of 2,2,3,3-tetrafluoropropyl acrylate (II), 5.0~30.0 wt % of trimethylolpropane triacrylate (III), and 0.1~5.0 wt % of photopolymerization initiator (Iv), wherein the weight ratio [(I)/(II)] of monomer (I) and monomer (II) is within a range of from 75/25 to 98/2, and an optical fiber having a cladding formed by the hardening of this curable composition and a core comprising quartz.

The curable composition for optical fiber cladding relating to the present invention has good transparency and homogeneity even at room temperature and has superior transparency and mechanical strength even after hardening. Accordingly, in the case in which this composition is used for cladding material in optical fibers, there is no need to apply heat as was the case with conventional cladding materials, so that the composition possesses extremely superior operability, and furthermore, it is possible to greatly reduce the problem of eccentricity which often resulted from the application of heat. Moreover, by means of utilizing this composition as cladding material for optical fibers, it is possible to obtain an optical fiber possessing superior mechanical strength, optical characteristics, and resistance to the environment such as resistance to heat and moisture.

DETAILED DESCRIPTION OF THE INVENTION

The present invention relates to a curable composition for use in optical fiber cladding comprising 48.8~92.9 wt % of 2-(perfluorooctyl) ethyl acrylate (I), 1.3~23.8 wt % of 2,2,3,3-tetrafluoropropyl acrylate (II), 5.0~30.0 wt % of trimethylolpropane triacrylate (III), and 0.1~5.0 wt % of photopolymerization initiator (IV), wherein the weight ratio [(I)/(II) ] of monomer (I) and monomer (II) is within a range of from 75/25 to 98/2, as well as to an optical fiber having cladding formed by hardening this curable compound and a core comprising quartz.

In the present invention, the combination and mixing proportions of (I), (II), and (III) above are extremely important for the attainment of the low index of refraction, the compatibility and mixability, transparency, and operability before curing, the superior transparency and mechanical strength after curing, and the superior mechanical strength, optical characteristics, and resistance to the environment such as resistance to heat and moisture, even in the optical fiber, all of which are necessary in the optical fiber cladding material.

First, 2-(perfluorooctyl) ethyl acrylate (I) is necessary in order to exhibit a low index of refraction, which is a necessary optical characteristic for optical fiber cladding material, and furthermore, it is important for the maintenance of hardness after curing and for the maintenance of resistance to the environment, such as resistance to heat or moisture. Furthermore, 2,2,3,3-tetrafluoropropyl acrylate (II) is necessary in order to exhibit the transparency and compatible stability of the cladding before curing which is important in the manufacturing of optical fiber and furthermore for exhibiting wettability with respect to the optical fiber core material, such as quartz, silica, glass, and the like. If (II) is missing, the transparency and compatible stability of the cladding material, and the wettability and adhesion of the cladding material with respect to the optical fiber core material is reduced, and the optical characteristics and dynamic characteristics of the optical fiber become inferior. In addition, trimethylolpropane triacrylate (III) is necessary in order to exhibit curability and transparency of the curable compound for use in optical fiber cladding relating to the present invention, and also in order to exhibit mechanical strength and resistance to the environment, such as resistance to heat and moisture, after curing.

As stated in the above, in order to obtain an optical fiber cladding material in which compatibility and transparency are good at room temperature, which has superior operability with a low index of refraction, superior mechanical strength in the optical fiber, and which exhibits superior optical characteristics and resistance to the environment, a mixture of 2-(perfluorooctyl) ethyl acrylate (I), 2,2,3,3-tetrafluoropropyl acrylate (II), and trimethylolpropane triacrylate (III) is necessary. The proportion of the curable composition for use in optical fiber cladding relating to the present invention occupied by (I) is 48.8~92.9 wt %, the proportion of (II) is 1.3~23.8 wt %, and the proportion of (III) is 5.0~30.0 wt %, and furthermore, the weight ratio [(I)/(II)] of monoomer (I) and monomer (II) is in a range of from 75/25~98/2. If this value is not within this range, the compatibility, transparency, the stability thereof, the mechanical strength, and the optical characteristics of the curable composition for use in optical fiber cladding at room temperature becomes inferior, the efficiency and operability of manufacture of the optical fiber becomes poor, and furthermore, mechanical strength, optical characteristics, and resistance to the environment of the optical fiber thus manufactured are reduced. It is possible to use, as the photopolymerization initiator (IV), a photopolymerization initiator which is known in the field, such as, for example, benzophenone, acetophenone, benzoin, benzoin ethyl ether, benzoin isobutyl ether, benzyl methyl ketal, azobis(isobutylonitrile), hydroxycyclohexyl phenyl ketone, 2-hydroxy-2-methyl-1-phenyl propane-1-one, or the like. It is possible, where necessary, to add to this photopolymerization initiator a photosensitizer such as an amine compound or a phosphorus compound so as to increase the speed of polymerization.

The preferred proportions of photopolymerization initiator in the curable composition used in optical fiber cladding of the present invention is 0.1~5 wt %. If the proportion is below this range, the curability is markedly reduced, and furthermore, if this range is exceeded, the curability does not increase any more; rather, there is the danger of yellowing after curing and a reduction in optical characteristics as a cladding material.

Furthermore, it is also possible to include fluoro(meth)acrylate containing a fluorinated alkyl group which differs from those mentioned above in the curable composition for use in optical fiber cladding of the present invention in order to regulate the index of refraction. In the present invention, compounds containing acryloyl groups or methacryloyl groups are referred to as (meth)acrylate.

The following examples of this type of fluoro(meth)acrylate containing fluorinated alkyl groups.

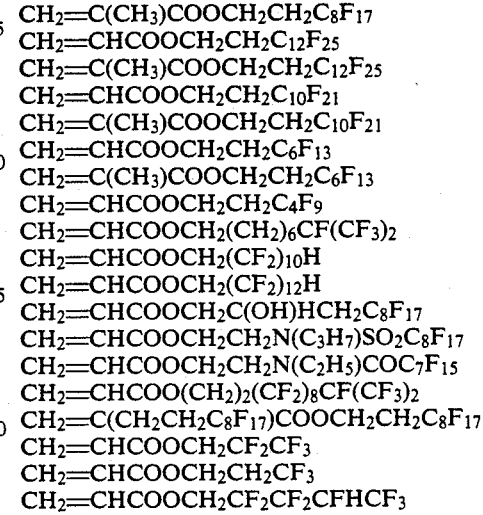

$CH_2{=}C(CH_3)COOCH_2CH_2C_8F_{17}$
$CH_2{=}CHCOOCH_2CH_2C_{12}F_{25}$
$CH_2{=}C(CH_3)COOCH_2CH_2C_{12}F_{25}$
$CH_2{=}CHCOOCH_2CH_2C_{10}F_{21}$
$CH_2{=}C(CH_3)COOCH_2CH_2C_{10}F_{21}$
$CH_2{=}CHCOOCH_2CH_2C_6F_{13}$
$CH_2{=}C(CH_3)COOCH_2CH_2C_6F_{13}$
$CH_2{=}CHCOOCH_2CH_2C_4F_9$
$CH_2{=}CHCOOCH_2(CH_2)_6CF(CF_3)_2$
$CH_2{=}CHCOOCH_2(CF_2)_{10}H$
$CH_2{=}CHCOOCH_2(CF_2)_{12}H$
$CH_2{=}CHCOOCH_2C(OH)HCH_2C_8F_{17}$
$CH_2{=}CHCOOCH_2CH_2N(C_3H_7)SO_2C_8F_{17}$
$CH_2{=}CHCOOCH_2CH_2N(C_2H_5)COC_7F_{15}$
$CH_2{=}CHCOO(CH_2)_2(CF_2)_8CF(CF_3)_2$
$CH_2{=}C(CH_2CH_2C_8F_{17})COOCH_2CH_2C_8F_{17}$
$CH_2{=}CHCOOCH_2CF_2CF_3$
$CH_2{=}CHCOOCH_2CH_2CF_3$
$CH_2{=}CHCOOCH_2CF_2CF_2CFHCF_3$

Furthermore, it is possible to add a multifunctional (meth) acrylate commonly known in the field to the curable composition used in optical fiber cladding of the present invention in order to adjust the index of refraction and to adjust the mechanical strength after curing.

The following are examples of the multifunctional (meth) acrylate:
ethylene glycol di(meth)acrylate
diethylene glycol di(meth)acrylate
triethylene glycol di(meth)acrylate
polyethylene glycol di(meth)acrylate
  (numerical average molecular weight 200~1,000)
propylene glycol di(meth)acrylate
dipropylene glycol di(meth)acrylate
tripropylene glycol di(meth)acrylate
polypropylene glycol di(meth)acrylate
  (numerical average molecular weight 200~1,000)
neopenthyl glycol di(meth)acrylate
1,3-butanediol di(meth)acrylate
1,4-butanediol di(meth)acrylate
1,6-hexanediol di(meth)acrylate
hydroxy pivalic acid ester neopenthyl glycol di(meth)acrylate bisphenol A di(meth)acrylate
pentaerythritol tri(meth)acrylate
dipentaerythritol hexa(meth)acrylate
pentaerythritol tetra(meth)acrylate
trimethylolpropane di(meth)acrylate
dipentaerythritol monohydroxy penta(meth)acrylate
$CH_2=CHCOOCH_2(C_2F_4)_2CH_2OCOCH=CH_2$
$CH_2=CHCOOC_2H_4(C_2F_4)_3C_2H_4OCOCH=CH_2$
$CH_2=C(CH_3)COOC_2H_4(C_2F_4)_3C_2H_4OCOC(CH_3)=CH_2$ It is possible to include, where necessary, various types of additives in the curable composition for use in optical fiber cladding of the present invention in addition to the curable fluoro-monomer and multifunctional monomer, insofar as this is permitted by the conditions of curing and compatibility. Examples of additives include: antioxidants such as hindered phenol compounds, photostabilizers, coupling agents, which support adhesion and bonding to the optical fiber core, antifoaming agents for the purpose of even application to the optical fiber core, leveling agents or surfactants, flame retardants, plasticizers, and the like.

Coupling agents include silane types, titanium types, and zirco-aluminate types; among these, silane types such as dimethyl dimethoxy silane, dimethyl diethoxy silane, methyl trimethoxy silane, dimethylvinyl methoxy silane, phenyl trimethoxy silane, γ-chloropropyl trimethoxy silane, γ-chloropropylmethyl dimethoxy silane, γ-aminopropyl triethoxy silane, γ-glycidoxypropyl trimethoxy silane, γ-glycidoxypropylmethyl dimethoxy silane, γ-methacryloxypropyl methoxy silane, γ-methacryloxypropylmethyl dimethoxy silane, γ-acryloxypropyl trimethoxy silane, γ-acryloxypropyimethyl dimethoxy silane, γ-mercaptopropyl trimethoxy silane and the like are especially preferable. Among these, from the point of view of achieving reliable resistance to the environment such as resistance to heat or resistance to moisture, γ-mercaptopropyl trimethoxy silane is especially preferable.

The amount of coupling agent added to 100 parts per weight of curable composition for use in optical fiber cladding of the present invention is preferably 0.1-5.0 parts per weight. Particularly, 0.5-3.0 wt % is preferable. If the added amount is less than this, the adhesion and bonding ability of the cladding material to the optical fiber core will be reduced, and there is a tendency for the mechanical strength and solvent resistance to worsen, so that this is not preferable. Furthermore, when the above range is exceeded, the mechanical strength of the cladding material is reduced, and there is a tendency for the strength of the optical fiber to be reduced, so that this is also not preferable.

As an antioxidant, it is possible to use, in addition to the above chemical compounds containing hindered phenol, chemical compounds containing phosphorus or antioxidants conventionally known in the field.

Examples of flame retarders include flame retarders containing bromide, zinc compounds, chemical compounds containing antimony, and chemical compounds containing phosphorus.

Examples of flame retarders containing bromide include decabromo diphenyloxide, hexabromobenzene, hexabromocyclo dodecane, dodecachloro pentacyclo octadeca 7,15 diene, tetrabromo bisphenol A, tribromophenol, tetrabromo phthalic anhydride, dibromo neopenthyl glycol, 2-(2,4,6-tribromophenoxy) ethyl(meth)acrylate, and the like.

Examples of zinc compounds include zinc borate compounds such as $3ZnO—2B_2O_3—3H_2O$, $2ZnO—3B_2O_3—3,5H_2O$, and the like, molybdenum zinc compounds such as $ZnO—ZnMoO_4$, $CaO—ZnMoO_4$, and the like, sintered complexes such as $Zn_3(PO_4)_24H_2O$, ZnO and MgO, and ZnO, $ZnCO_3$ and the like. Furthermore, examples of the compound containing antimony include, for example, antimony trioxide and the like.

Furthermore, a compound containing fluorine is preferable for use as the antifoaming agent, leveling agent, and surfactant.

After the curable composition for use in optical fiber cladding of the present invention has been applied to the optical fiber core, or the optical fiber core has been impregnated thereinto, polymerization and curing are carried out by means of exposure to ultraviolet radiation, and it is thus possible to form the desired cladding layer. Furthermore, it is also possible, in some cases, to concomitantly use heat as an energy source as well.

In the case in which heat is concomitantly used, it is possible to conduct polymerization and curing in the presence of a non-catalyst or a thermo-polymerization initiator such as, for example, azobis isobutylonitrile, benzoyl peroxide, methylethylketone peroxide-cobalt naphthalate, or the like.

Furthermore, it is possible to add a solvent to the curable composition for use in optical fiber cladding of the present invention in order to control the viscosity, applicability, or thickness of the applied layer. Insofar as there is no adverse affect upon the polymerization reactability, the use of solvents is not particularly restricted; for example, alcohol types such as methanol, ethanol, isopropyl alcohol, and the like, ketone types such as acetone, methylethylketone, methylisobutylketone, and the like, ester types such as methyl acetate, ethyl acetate, butyl acetate, and the like, chlorine types such as chloroform, dichloroethane, carbon tetrachloride, and the like, and methane types such as m-xylene hexafluoride, tetrachloro difluoroethane, 1,1,2-trichloro-1,2,2-trifluoroethane, trichloromonofluoride, and the like, are preferable from the point of view of operability in that they are solvents with low boiling points. In the case in which solvents are included in this manner, prior to the initiation of polymerization and curing, a process is necessary in which solvent is removed at normal temperatures or, when necessary, with the addition of heat or the decrease of pressure. In the case in which the solvent is removed by heating, it is necessary to control the temperature so that thermal polymerization of the monomers and the like can not be induced.

The curable composition for use in optical fiber cladding of the present invention is preferably applicable as a cladding material for optical fibers having a quartz core. The reason for this is that it has superior transparency, resistance to the environment, and easy manufacturing.

It is acceptable to use artificial quartz synthesized by means of the plasma method or the soot accumulation method or the like as the quartz used as the core material, or natural quartz may also be used.

In the case in which curable composition for use in optical fiber cladding of the present invention is cured and used for the cladding of an optical fiber which has a core comprising quartz, in order to improve the Weibull fracture strength and crimping characteristics (characteristics related to the reduction in the amount of light resulting from crimping) of the optical fiber, it is preferable that the cladding (after curing) has a Shore hardness of D65 or more. This Shore hardness value is measured by means of method D according to ASTM-D2240. In order to attain this Shore hardness standard, for example, it is preferable to set the weight ratio [(I)/(III)] of monomer (I) and monomer (III) in the curable composition to the lowest level thereof. Furthermore, in the case in which the curable composition of the present invention is cured and used as cladding for an optical fiber having a core comprising quartz, it is preferable that this cladding (after curing) have an index of refraction less than 1.427. In the case in which this index of refraction exceeds 1.427, the numerical aperture of the optical fiber will be too small, and it is difficult to attain a satisfactory amount of intercepted light in the optical fiber. In order to achieve this index of refraction standard, for example, it is preferable to set the weight proportion sum [(I)+(II)] of monomer (I) and monomer (II) in the curable composition to a high level.

In addition, in accordance with the present invention, the homogeneity (that is to say, the transparency) of the curable composition for use in cladding is improved, and furthermore, it is possible to improve the adhesion of the core to the cladding and to improve the Shore hardness of the cladding, so that, as a result, it is possible to increase the Weibull average fracture strength value of the tensile fracture strength measured in a nine meter long optical fiber to more than 450 kg/mm$^2$ so that it is possible to obtain high strength reliability.

This Weibull average fracture strength (also called the average value of the Weibull fracture strength) has a value which is arrived at in the following method.

The tensile force (kg) on a 9-meter long optical fiber sample is measured at $N=100$; this tensile force is divided by The cross section of the core and a tensile fracture strength (kg/mm$^2$) is obtained, the Weibull distribution is obtained from this tensile fracture strength, and from this Weibull distribution, the point at which the cumulative fracture probability is 63.2% is found, and the Weibull average fracture strength (kg/mm$^2$) is taken.

Furthermore, the Weibull smallest fracture strength (also termed the "smallest value" of the Weibull fracture strength) (kg/mm$^2$) has a value which is obtained by finding from the same Weibull distribution, the point at which the cumulative fracture probability is 1%.

In addition, a representative value for the diameter of the optical fiber is 200 μm at the core, however, in addition to this, in cases where the core is thinner, it is possible to reduce the diameter of the core to several micrometers for use as a single mode fiber. On the other hand, in the case in which the diameter of the core is large, a core diameter of 1,000 or 2,000 μm is acceptable, and with this type of optical fiber having a large diameter, as well, according to the present invention, the ease of handling thereof will be greatly improved.

Furthermore, with regard to the thickness of the cladding, it is acceptable if the cladding have a thickness of at least several micrometers which is necessary as a reflective layer for the optical fiber transmission path, however, considering the product qualities including curability, economic efficiency, and resistance to the environment, a thickness of 15 μm is preferable.

Such an optical fiber can be manufactured according to ordinary methods.

For example, after a quartz rod to be used as core material has been preprocessed by means of flame polishing or hydrofluoric acid, melt-drawing is carried out in a high frequency furnace and electrical resistance carbon furnace, or an oxygen-hydrogen flame, and the optical fiber core material is thus produced. Next, this optical fiber core material is passed through a cladding coating die which is continuously supplied with the composition for use in cladding in liquid form, and this composition is continuously applied to the surface thereof, and afterward, when necessary, the removal of the solvent, this is irradiated with ultraviolet radiation and a cladding layer is formed. This method is disclosed in, for example, German Patent No. 2,459,320, Japanese Patent Application, First Publication, Laid-Open No. Sho 53-139545, and U.S. Pat. No. 4,125,644.

The light source used at the time of the polymerization and curing of the curable composition for use in optical fiber cladding of the present invention by means of ultraviolet radiation may be one commonly known in the field; for example, carbon arc, xenon lamp, intermediate pressure mercury lamp, high pressure mercury lamp, super high pressure mercury lamp, electrodeless lamp, or metal halide lamp, or the like. Furthermore, from the point of view of increasing the efficiency of polymerization, it is preferable to conduct the irradiation in an atmosphere of an inert gas such as nitrogen or the like.

The optical fiber having a cladding layer formed around the core in this manner is then taken up through a roller which is speed-controlled, and when necessary, it is covered with a resin composition having a protective function, and is then wound.

Next, concrete examples of the present invention will be described; however, it is of course to be understood that no limitations are placed on the present invention by means of these explanations.

EXAMPLE 1

66.23 weight parts of 2-(perfluorooctyl)ethyl acrylate, 9.25 weight parts of 2,2,3,3-tetrafluoropropylacrylate, 24.05 weight parts of trimethylolpropane triacrylate, 0.47 weight parts of 2-hydroxy-2-methyl-1-phenyl-propane-1-one (Merck Co., trade name Duralcure-1173), and 2.00 weight parts of γ-mercaptopropyltrimethoxysilane were mixed at room temperature and a curable composition for optical fiber cladding (hereinbelow termed "cladding composition") was obtained. The transparency of this cladding composition was evaluated by visual inspection before curing and was found to be transparent.

Next, this cladding composition was poured into polyethylene frames to a depth of 1 mm and 5 mm, this was covered with polyester film so that air bubbles could not enter, irradiated with ultraviolet radiation for a period of 5 seconds under a high pressure mercury lamp with an output of 80 W/cm and cured, and thus cured plates were obtained.

Using the cured plate with a depth of 1 mm obtained in the above manner, the index of refraction was measured in an Abbe's refractometer. The index of refraction of this cured plate was $ND^{25}=1.407$.

Furthermore, the Shore hardness of the cured plate having a thickness of 5 mm obtained in the above manner was measured. The Shore hardness (at 23° C.) of this cured plate was D77.

In addition, the transparency of the cured plate was evaluated by visual inspection and was found to be transparent.

Furthermore, the cured plate with a thickness of 1 mm was retained at 120° C. for ten days and a heat-resistance trial was thus carried out. As a result, it was found that the transparency and the outward appearance were unchanged.

EXAMPLES 2–5, COMPARATIVE EXAMPLES 1–7

The various materials shown in Table 1 were mixed in the amounts indicated following the same procedures as in Example 1, the result was cured, and the transparency before curing, the transparency after curing, the index of refraction of the cured plate, an evaluation of Shore hardness, and a heat-resistance trial were performed on the cured plate. The results of the measurements of the various compounds are shown in Table 1.

mitted light loss (850 nm) is small at 2.90 dB/km, so that the optical characteristics are superior.

In addition, the Weibull average fracture strength in an optical fiber of a length of 9 meters is 550 kg/mm$^2$, the Weibull smallest fraction strength is high at 545 kg/mm$^2$, and moreover, this difference is small at 5 kg/mm$^2$, so that the optical fiber has an extremely high degree of strength reliablity.

In addition, 1 kilometer of the optical fiber thus obtained was measured for transmitted light amount in an atmosphere of 25° C. and 50% RH and was next placed in the low temperature of $-60°$ C., where the transmitted light amount was measured. The transmittance loss caused by placing the optical fiber at the low temperature of $-60°$ C. was noted to increase; however, this

TABLE 1

| COMPONENTS | EXAMPLES (Units in parts per weight) | | | | COMPARATIVE EXAMPLES (Units in parts per weight) | | | | | | |
|---|---|---|---|---|---|---|---|---|---|---|---|
| | 2 | 3 | 4 | 5 | 1 | 2 | 3 | 4 | 5 | 6 | 7 |
| $CH_2CHCOOCH_2CH_2C_8F_{17}$ | 66.23 | 82.82 | 92.63 | 48.80 | 75.48 | 52.84 | 22.64 | 56.62 | 61.89 | | 66.23 |
| $CH_2CHCOOCH_2CF_2CF_2H$ | 9.25 | 1.70 | 1.90 | 16.20 | | 22.64 | 52.84 | 7.91 | 8.64 | 9.25 | 9.25 |
| $CH_2CHCOOCH_2C_{10}F_{20}H$ | | | | | | | | | | 66.23 | |
| Trimethylol propane triacrylate | 24.05 | 15.00 | 5.00 | 30.00 | 24.05 | 24.05 | 24.05 | 35.00 | 22.47 | 24.05 | |
| Pentaerythritol tetraacrylate | | | | | | | | | | | 24.05 |
| D1173 | 0.47 | 0.47 | 0.47 | 5.00 | 0.47 | 0.47 | 0.47 | 0.47 | 7.00 | 0.47 | 0.47 |
| γ-mercaptopropyl trimethoxysilane | | 1.00 | | 2.00 | | | | | | | |
| Transparency (before curing) | Transparent | Transparent | Transparent | Transparent | Nontransparent | Transparent | Transparent | Nontransparent | Transparent | Nontransparent | Nontransparent |
| Transparency (after curing) | Transparent | Transparent | Transparent | Transparent | Nontransparent | Transparent | Transparent | Nontransparent | Transparent | Nontransparent | Nontransparent |
| Index of Refraction after curing $nD^{25}$ | 1.405 | 1.388 | 1.374 | 1.423 | — | 1.412 | 1.432 | 1.419 | 1.409 | — | — |
| Shore hardness | D77 | D69 | D55 | D80 | D62 | D54 | D48 | D74 | D64 | D56 | D60 |
| Heat-resistance test result | Transparent | Transparent | Transparent | Transparent | Nontransparent | Became fragile | Became fragile | Nontransparent | Yellowed | Disintegrated | Disintegrated |

D-1173: 2-hydroxy-2-methyl-1-phenylpropane-1-one

EXAMPLE 6

An artificial quartz rod synthesized by means of a plasma method was subjected to flame polishing preprocessing by means of an oxygen-hydrogen flame, and was then continuously supplied to a furnace with a temperature of 2,200° C., a core with a diameter of 200 μm was produced by melt-drawing, and thus the optical fiber base was produced. This base was passed through a clad coating die which was supplied with the cladding composition prepared in Example 1 and filtered through a 0.1 μm filter, the composition was continuously supplied to the surface of the base, this was then irradiated with light from a 300 W/inch electrodeless lamp having a main emission wave length of 360 nm and cured, this was taken up on a roller, and was then wound as an optical fiber having an outer diameter of 228 μm.

This cladding composition, has high transparency and homogeneity at room temperature, so that it is possible to conduct the transmittance and turbidity tests at the time of preparation at room temperature, and furthermore, it is possible to supply this to the clad coating die at room temperature, so that the operability is superior.

Moreover, the optical fiber thus obtained has the high numerical aperture of 0.38, and furthermore, the transincrease was only 1.01 dB/km.

Next, the same optical fiber of a length of 1 kilometer was measured for transmitted light amount after being kept in an environment of high temperature and moisture of 70° C. and 90% RH for 1,000 hours, and judging from the difference from the transmitted light amount under the environmental conditions of 25° C. and 50% RH, an increase in transmission loss resulting from the high temperature and moisture environment was noted; however, this increase was only 0.23 dB/km.

In this way, the optical fiber of the present invention exhibits extremely stable transmission characteristics, even with respect to changes in environmental temperature and moisture, so that the transmission reliablity thereof is high.

Next, the optical fiber thus obtained was subjected to ultrasonic vibration for 30 minutes while being dipped in an ethylacetate solvent, and then was removed from the solvent, and swelling and changes in the cladding layer were evaluated by means of scratching the cladding layer with a nail to determine if it would peel away. It was found that the cladding layer was as strong as it was before being dipped in the solvent, so that it could not be peeled away, and no swelling or changes could be found. In this way, the cladding layer for optical fibers of the present invention is superior in solvent resistance.

The optical fiber thus obtained is inserted into a crimping type connector for use in PCF made by Toshiba (Model No. TOCP101QK), and after the cladding part has been crimped, the fiber end part protruding from the connector is stress fractured by a fiber cutter, and a smooth end surface is obtained. The crimping force is adjusted at this time so that the force needed to remove the optical fiber is 2 kgf.

The fractured end surface of the optical fiber attached to a connector thus obtained was examined under a microscope, and in this end surface, absolutely no flaws could be detected in the cladding material. Furthermore, on measuring the transmitted light amount at the end of the optical fiber inserted into the connector and crimped thereon, the reduction in the amount of transmitted light resulting from the crimping was extremely small at 0.08 dB for 1 fiber, so that the transmissivity is very stable.

EXAMPLE 7

Except for using the cladding composition prepared in Example 2, an optical fiber was manufactured according to an identical method to that of Example 6, and evaluated. The results obtained are as shown in Table 2, and as in the case of Example 6, an optical fiber was obtained which exhibited superior characteristics.

COMPARATIVE EXAMPLE 8

Except for utilizing the cladding composition compared in Comparative Example 1 in a state in which it was heated to 50° C., an optical fiber was produced by a method identical to that of Example 6, and evaluated.

The cladding composition of Comparative Example 1 is not transparent at room temperature, so that it was impossible to test the transparency and turbidity at room temperature so that it was necessary to conduct these tests after heating to 50° C., so that the operability is poor.

Furthermore, the characteristics of the optical fiber thus obtained are, as shown in Table 2, unsatisfactory with the exception of the numerical aperture of the optical fiber.

The Shore hardness D and index of refraction of the cladding of the optical fibers obtained in Examples 6, 7 and Comparative Example 8 have values as shown for Examples 1, 2, and Comparative Example 1.

TABLE 2

| TYPE OF CLADDING COMPOSITION | EXAMPLE 6 EXAMPLE 1 | EXAMPLE 7 EXAMPLE 2 | COMPARATIVE EXAMPLE 8 COMPARATIVE EXAMPLE 1 |
|---|---|---|---|
| OPTICAL FIBER CHARACTERISTICS | | | |
| Numerical Aperture (NA) | 0.38 | 0.39 | 0.39 |
| Transmission Loss (850 nm) (dB/km) | 2.90 | 3.04 | 8.23 |
| Weibull Fracture Strength | | | |
| Average Value (kg/mm$^2$) | 550 | 530 | 251 |
| Smallest Value (kg/mm$^2$) | 545 | 517 | 132 |
| Low-Temperature Characteristics (−60° C.) (dB/km) | 1.01 | 1.02 | 4.29 |
| High-Temperature Characteristics (70° C., 90% RH) (dB/km) | 0.23 | 0.26 | 1.92 |
| Solvent Resistance [Swelling or Change After Exposure to Solvent] | No Swelling or Change (No Peeling) | Some Swelling and Change (Some Peeling) | Considerable Swelling and Change (Considerable Peeling) |
| Flaws in Cladding of Fractured Surface | None | None | Partial |
| Reduction in Light Amount Resulting from Crimping | 0.08 | 0.08 | 1.54 |

What is claimed is:

1. A curable composition for optical fiber cladding comprising:
    48.8~92.9 wt % of 2-(perfluorooctyl)ethyl acrylate (I);
    1.3~23.8 wt % of 2,2,3,3-tetrafluoropropylacrylate (II);
    5.0~30.0 wt % of trimethylolpropanetriacrylate (III); and
    0.1~5.0 wt % of photopolymerization initiator (IV);
wherein a weight ratio [(I)/(II)] of monomer (I) and monomer (II) is within a range of 75/25~98/2.

2. A curable composition for optical fiber cladding according to claim 1, wherein
    0.1~5.0 wt parts of γ-mercaptopropyltrimethoxysilane is contained with respect to 100 wt parts of said curable composition.

3. An optical fiber having a cladding comprising cured curable composition according to claim 1 and a core comprising quartz.

4. An optical fiber having a cladding comprising cured curable composition according to claim 2 and a core comprising quartz.

5. An optical fiber according to one of claims 3 or 4, the cladding comprising cured curable composition has a Shore hardness of D65 or greater.

6. An optical fiber according to one of claims 3 or 4, in which cladding comprising cured curable composition has an index of refraction of 1.427 or less.

7. An optical fiber according to one of claims 3 or 4, wherein a Weibull average fracture strength of the optical fiber is at least 450 kg/mm$^2$.

8. A curable composition for optical fiber cladding according to claim 1 comprising 2-hydroxy-2-methyl-1-phenylpropan-1-one as the photopolymerization initiator (IV).

9. A curable composition for optical fiber cladding according to claim 2 comprising 2-hydroxy-2-methyl-1-phenylpropan-1-one as the photopolymerization initiator (IV).

10. An optical fiber having a cladding comprising cured curable composition according to one of claims 8 or 9 and a core comprising quartz.

* * * * *